United States Patent
Isono

(10) Patent No.: US 9,534,649 B2
(45) Date of Patent: Jan. 3, 2017

(54) FRICTION BRAKE DEVICE

(75) Inventor: Hiroshi Isono, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/391,084

(22) PCT Filed: Apr. 7, 2012

(86) PCT No.: PCT/JP2012/059608
§ 371 (c)(1),
(2), (4) Date: Oct. 7, 2014

(87) PCT Pub. No.: WO2013/150656
PCT Pub. Date: Oct. 10, 2013

(65) Prior Publication Data
US 2015/0060215 A1    Mar. 5, 2015

(51) Int. Cl.
*F16D 65/092* (2006.01)
*F16D 65/18* (2006.01)
*F16D 55/225* (2006.01)
*F16D 65/02* (2006.01)
*F16D 121/04* (2012.01)

(52) U.S. Cl.
CPC .......... *F16D 65/092* (2013.01); *F16D 55/225* (2013.01); *F16D 65/183* (2013.01); *F16D 2065/026* (2013.01); *F16D 2121/04* (2013.01)

(58) Field of Classification Search
CPC .............. F16D 55/40; F16D 2055/0087; F16D 2055/0054; F16D 2055/0058; F16D 65/092
See application file for complete search history.

(56) References Cited

U.S. PATENT DOCUMENTS

| 1,696,879 A | 12/1928 | Chase et al. |
| 2,240,219 A | 4/1941 | Lambert |
| 2,649,941 A | 8/1953 | Doebeli |

(Continued)

FOREIGN PATENT DOCUMENTS

| DE | 26 33 460 A1 | 1/1978 |
| EP | 1 118 790 A2 | 7/2001 |

(Continued)

OTHER PUBLICATIONS

International Search Report Issued May 29, 2012 in PCT/JP12/059608 Filed Apr. 7, 2012.

(Continued)

*Primary Examiner* — Robert A Siconolfi
*Assistant Examiner* — James Hsiao
(74) *Attorney, Agent, or Firm* — Oblon, McClelland, Maier & Neustadt, L.L.P.

(57) ABSTRACT

A friction brake device has a brake rotor which rotates around a rotation axis, brake pads as rotating friction members which rotate around an autorotation axis parallel to the rotation axis, rotational torque transmission devices which mutually transmit rotational torques between the brake rotor and the brake pads without depending on the friction force between the brake rotor and the brake pads, and pressing devices which press the brake pads against the brake rotor. The pressing devices press the brake pads against the brake rotor by way of non-rotating friction members which are supported so as not to rotate around the autorotation axis.

5 Claims, 4 Drawing Sheets

(56) References Cited

U.S. PATENT DOCUMENTS

| | | | |
|---|---|---|---|
| 3,285,372 | A | 11/1966 | Rossmann |
| 3,570,640 | A | 3/1971 | Martz |
| 3,752,267 | A | 8/1973 | Dovell et al. |
| 4,054,189 | A | 10/1977 | Klaue |
| 4,139,081 | A | 2/1979 | Klaue |
| 4,235,311 | A | 11/1980 | Brinkmann et al. |
| 4,337,855 | A | 7/1982 | Bennett |
| 5,103,941 | A | 4/1992 | Vranish |
| 5,796,192 | A * | 8/1998 | Riepl .................. A61G 5/04 180/65.51 |
| 5,819,883 | A | 10/1998 | Organek et al. |
| 5,911,292 | A * | 6/1999 | Schade ................ B30B 15/10 192/113.34 |
| 6,082,504 | A | 7/2000 | Organek et al. |
| 6,397,980 | B1 | 6/2002 | Johnson |
| 6,491,138 | B1 | 12/2002 | Spägele |
| 7,073,636 | B2 | 7/2006 | Baumann et al. |
| 2003/0164271 | A1 | 9/2003 | Boisseau |
| 2004/0154881 | A1 | 8/2004 | Baumann et al. |
| 2007/0045061 | A1 | 3/2007 | Murayama |
| 2010/0147633 | A1 | 6/2010 | Kim |
| 2012/0234121 | A1 * | 9/2012 | Jensen ................. F16D 67/00 74/411.5 |
| 2014/0166428 | A1 * | 6/2014 | Van Druten .......... F16D 13/70 192/113.2 |
| 2015/0060215 | A1 | 3/2015 | Isono |
| 2015/0096856 | A1 | 4/2015 | Isono |
| 2015/0114768 | A1 * | 4/2015 | Doleschel ............ F16D 55/36 188/72.3 |

FOREIGN PATENT DOCUMENTS

| | | |
|---|---|---|
| JP | 52-93857 A | 8/1977 |
| JP | 62-126630 A | 6/1987 |
| JP | 8-121509 A | 5/1996 |
| JP | 10-169677 A | 6/1998 |
| JP | 2000-502783 A | 3/2000 |
| JP | 2004-51 4859 A | 5/2004 |
| JP | 2004-225902 A | 8/2004 |
| JP | 2006-177532 A | 7/2006 |
| JP | 2008 151199 | 7/2008 |
| JP | 2010-242841 A | 10/2010 |
| WO | WO 97/25547 A1 | 7/1997 |
| WO | WO 2013/157644 A1 | 10/2013 |
| WO | WO 2013/157645 A1 | 10/2013 |
| WO | WO 2013/157646 A1 | 10/2013 |

OTHER PUBLICATIONS

Notice of Allowance Issued Apr. 6, 2016 in copending U.S. Appl. No. 14/391,028.
Office Action dated May 23, 2016, in co-pending U.S. Appl. No. 14/395,642.
Office Action issued Jul. 11, 2016 in U.S. Appl. No. 14/390,640.
Office Action issued Jul. 22, 2016 in U.S. Appl. No. 14/395,647.
Office Action issued Jul. 27, 2016 in U.S. Appl. No. 14/395,693.
U.S. Office Action issued on Oct. 31, 2016 in co-pending U.S. Appl. No. 14/395,642, filed Oct. 20, 2014.

* cited by examiner

FRICTION BRAKE DEVICE

TECHNICAL FIELD

The present invention relates to a friction brake device and, more particularly, to a friction brake device which generates friction force by pressing a friction member against a brake rotor.

BACKGROUND ART

As is described, for example, in the under-mentioned patent citation 1 which corresponds to an application filed by the same applicant as the present application, as one of friction brake devices, a friction brake device has been known in which friction members that are pressed against a rotor disk are rotatable about an autorotation axis parallel to the rotation axis of the rotor disk. In this disk type brake device, a braking torque is generated by means of revolution of the friction members around the rotation axis relative to the rotor disk and a resistance torque is generated by means of autorotation of the friction members about the autorotation axis relative to the rotor disk. Another braking torque is generated by means of the resistance torque being transmitted to the rotor disk by a gear device.

According to a brake device described in the above-mentioned patent citation 1, as compared to a conventional general brake device in which a braking torque is generated only by means of the friction members revolving relative to the rotor disk, a braking force can be increased. In particular, a braking force can be increased without increasing the pressing force with which the friction members are pressed against the rotor disk by pressing devices.

CITATION LIST

Patent Literature 1: Japanese Patent Application Laid-open Publication No. 2008-151199

SUMMARY OF INVENTION

Technical Problem

In the friction brake device described in the above-mentioned patent citation 1, however, the frictional engagement surfaces for the autorotation about the autorotation axis between the friction members and the rotor disk are the same surface only as the frictional engagement surfaces for the revolution around the rotation axis. Accordingly, the resistance against the autorotation of the friction members cannot be increased so as to increase a braking force.

A primary object of the present invention is to increase the resistance against the autorotation of a friction member without increasing the pressing force applied to the friction member so as to increase a braking force in a friction brake device which has a friction member auto-rotatable about an autorotation axis and a transmission device transmitting a rotational torque between a brake rotor and the friction member.

Solution to Problem and Advantageous Effects

The present invention provides a friction brake device comprising a brake rotor which rotates around a rotation axis; a rotating friction member which rotates around a autorotation axis parallel to the rotation axis; a rotational torque transmission device which mutually transmits rotational torque between the brake rotor and the rotating friction member without depending on the friction force between the brake rotor and the rotating friction member; and a pressing device which presses the rotating friction member against the brake rotor, wherein the pressing device presses the rotating friction member against the brake rotor by way of a non-rotating friction member which is supported so as not to rotate around the autorotation axis.

According to the configuration, resistance torques are generated not only by means of the rotating friction member auto-rotating relative to the rotor disk but also by means of the rotating friction member auto-rotating relative to the non-rotating friction members. The resistance torques are transmitted to the brake rotor by the rotational torque transmission device to generate a braking torque. A final braking torque is the sum of the braking torque and a braking torque which is generated by means of the rotating friction member revolving relative to the brake rotor.

Consequently, as compared to the brake device described in the above-mentioned Laid-open Publication, the resistance against the autoratation of the friction member can be increased to increase a braking force without increasing the pressing force with which the rotating friction member is pressed against the brake rotor by the pressing device.

The above-mentioned configuration may be such that: the rotating friction member has a disk part which is aligned with the autorotation axis, and when the non-rotating friction member is pressed against the rotating friction member by the pressing device, the rotating friction member frictionally engages with the brake rotor at one surface of the disk part and frictionally engages with the non-rotating friction member at the other surface of the disk part.

According to the configuration, as the resistance torques by the autorotations can be generated at both side surfaces of the disk part, the pressing force can efficiently be transmitted so that the pressing forces at both side surfaces conform to each other. As compared to where frictional engagement of the rotating friction member is conducted at one surface of the disk part and a section other than the other surface, a deforming stress acting on the rotating friction member can be reduced.

The above-mentioned configuration may be such that: the rotating friction member has a disk part which is aligned with the autorotation axis; one of the rotating friction member and the non-rotating friction member has a shaft part having a truncated conical surface; the other of the rotating friction member and the non-rotating friction member has a truncated conical surface which receives the truncated conical surface of the shaft part; and when the non-rotating friction member is pressed against the rotating friction member by the pressing device, the rotating friction member frictionally engages with the brake rotor at one surface of the disk part, and the rotating friction member and the non-rotating friction member frictionally engages with each other at the truncated conical surfaces.

According to the configuration, the engagement between the truncated conical surfaces of the rotating friction member and the non-rotating friction member enables the non-rotating friction member to support the rotating friction member rotatably about the autorotation axis and to generate a resistance torque by the frictional engagement between them.

The above-mentioned configuration may be such that: the rotational torque transmission device includes gears which are formed on the brake rotor and the rotating friction member and mesh with each other.

According to the configuration, a rotational torque is transmitted between the brake rotor and the rotating friction member by the rotational torque transmission device which includes the gears meshing with each other. Accordingly, the rotating friction member can reliably be rotated about the autorotation axis by the rotational torque of the brake rotor and the resistance torque generated by the autorotation of the rotating friction member can reliably be transformed into a braking force to be transmitted to the brake rotor.

The above-mentioned configuration may be such that: the rotating friction member frictionally engages with the brake rotor at one surface of the disk part and frictionally engages with the non-rotating friction member at the other surface of the disk part, and the distances from the autorotation axis of the rotating friction member to the centers of the two frictionally engaging areas are the same.

The above-mentioned configuration may be such that: the rotating friction member has a disk part and a shaft part aligned with the autorotation axis; the shaft part has a truncated conical surface; and the non-rotating friction member has a truncated conical surface which receives the truncated conical surface of the shaft part.

MODE FOR CARRYING OUT THE INVENTION

The present invention will now be described in detail with respect to preferred embodiments by referring to the accompanying drawings.

First Embodiment

Figure 1:
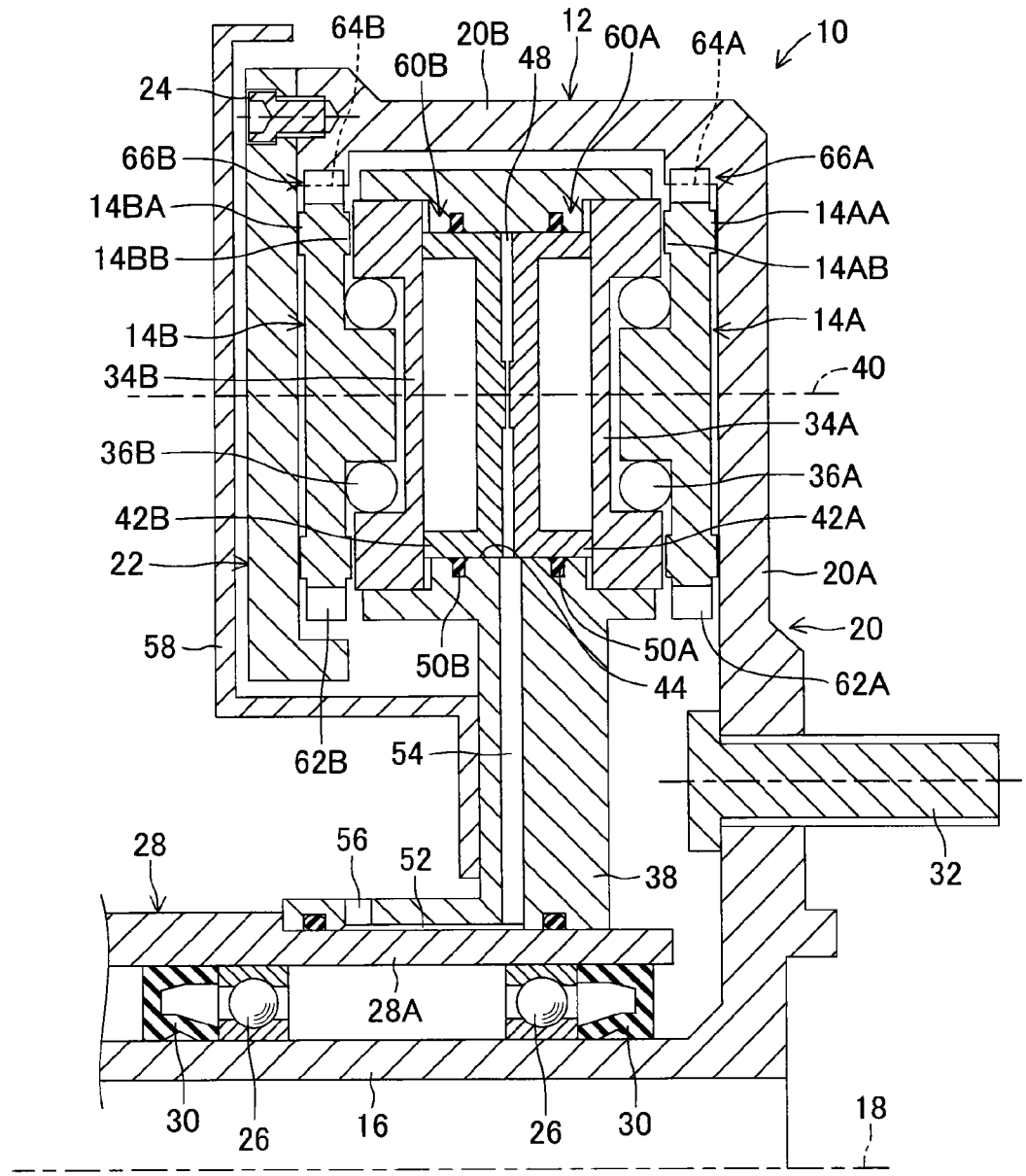
FIG. 1 is a sectional view showing a section of a first embodiment of the friction brake device according to the present invention which is adapted to be a brake device for a vehicle, as cut along a section passing through a rotation axis.

FIG. 1 is a sectional view showing a section of a first embodiment of the friction brake device according to the present invention which is adapted to be a brake device for a vehicle, as cut along a section passing through a rotation axis.

In FIG. 1, 10 denotes a whole of the brake device. The brake device 10 has a brake rotor 12 and brake pads 14A and 14B which act as first and second friction members, respectively. The brake rotor 12 rotates around a rotation axis 18 together with a rotating shaft 16 of a vehicle wheel, not shown. In particular, in the illustrated embodiment, the brake rotor 12 has a main rotor 20 which is integral with the rotating shaft 16 and a subsidiary rotor 22 which rotates integrally with the main rotor. The main rotor 20 and the subsidiary rotor 22 are made from the same metal.

The main rotor 20 has a disk part 20A and a cylindrical part 20B which are spaced apart from each other along the rotation axis 18. The disk part 20A is integrally connected at the inner peripheral portion to the rotating shaft 16 and extends like an annular plate perpendicularly to and around the rotation axis 18. The cylindrical part 20B is integrally connected to the outer peripheral portion of the disk part 20A and extends cylindrically around the rotation axis 18. The subsidiary rotor 22 extends like an annular plate perpendicularly to and around the rotation axis 18 and is coupled at the outer peripheral portion to an end of the cylindrical part 20B opposite to the disk part 20A by a plurality of bolts 24.

It is to be noted that the disk part 20A and the subsidiary rotor 22 have the same thickness and the thickness of the cylindrical part 20B is smaller than those of the disk part 20A and the subsidiary rotor 22. However, since the cylindrical part 20B extends cylindrically around the rotation axis 18, it has a rigidity higher than those of the disk part 20A and the subsidiary rotor 22.

Thus, the disk part 20A and the subsidiary rotor 22 serve as first and second disk parts, respectively, which extend perpendicularly to and around the rotation axis 18 and are spaced apart along the rotation axis 18. The cylindrical part 20B serves as a connection part which cooperates with the bolts 24 to integrally connect the outer peripheral portions of the disk part 20A and the subsidiary rotor 22. The disk part 20A, the cylindrical part 20B and the subsidiary rotor 22 form a staple-like sectional shape which opens radially inwardly as viewed in a radial section passing through the rotation axis 18. The opposed surfaces of the disk part 20A and the subsidiary rotor 22 define first and second friction surfaces which extend perpendicularly to the rotation axis 18 around the rotation axis 18 and are parallel to each other.

The rotating shaft 16 is rotatably supported around the rotation axis 18 by a sleeve part 28A of a wheel carrier member 28 through a pair of ball bearings 26. The space defined by the pair of ball bearings 26, the rotating shaft 16 and the sleeve part 28A is filled with lubricant such as grease. A pair of seal members 30 are arranged on both sides in axial direction of the pair of ball bearings 26 and seal the space between the rotating shaft 16 and the sleeve part 28A so that dust and muddy water do not enter the ball bearings 26.

Although not shown in the figure, the disk part 20A of the main rotor 20 is adapted to be integrally coupled to a rim part of the vehicle wheel by four bolts and nuts 32 screwed thereto, which are spaced apart by 90 degrees around the rotation axis 18. Consequently, the rotating shaft 16 and the brake rotor 12 (the main rotor 20 and the subsidiary rotor 22) rotate around the rotation axis 18 together with the wheel.

The brake pads 14A and 14B are arranged between the disk part 20A and the subsidiary rotor 22 and have the same shape and size to each other. The brake pads 14A and 14B each have a circular disk part and a shaft part which are aligned with each other. The disk parts are positioned on the sides of the disk part 20A and the subsidiary rotor 22. The disk part of the brake pad 14A has frictional portions 14AA and 14AB on the opposite sides of its outer peripheral portion and the disk part of the brake pad 14B has frictional portions 14BA and 14BB on the opposite sides of its outer peripheral portion. Each frictional portion bulges from the associated side surface of the disk part and extends as an annular strip around the axis of the associated brake pad.

It is to be noted that the brake pads 14A and 14B may be produced by, for example, powder metallurgy so that the frictional portions are integrally formed with the associated disk parts. Alternatively, the frictional portions may be formed by adhering annular strips made from frictional material to the side surfaces of a disk part by means of adhesive or other means. Furthermore, although the frictional portions 14AA to 14BB are made from the same friction material, they may be made from different friction materials from each other.

The shaft parts of the brake pads 14A and 14B are rotatably supported by non-rotational engagement members 34A and 34B, respectively, via a plurality of balls 36A and 36B. The non-rotational engagement members 34A and 34B have cylindrical parts which encircle the shaft parts of the brake pads 14A and 14B, respectively, and disk parts which are formed integrally to the ends of cylindrical parts opposite to the associated brake pads, but the disk parts may be omitted.

The cylindrical parts of the non-rotational engagement members 34A and 34B are supported by a stationary member 38 serving as a non-rotational member so that the engagement members can displace relative to the stationary member 38 along an autorotation axis (spin axis) 40 parallel to the rotation axis 18 but cannot rotate about the autorotation axis 40. Consequently, the brake pads 14A and 14B are supported so that they can displace relative to the disk part 20A and the subsidiary rotor 22 along the autorotation axis 40 and can rotate about the autorotation axis 40. Notably, prevention of the non-rotational engagement members from rotating may be achieved by providing the combination of a key and a key groove that extend along the autorotation axis 40 or planer surfaces engaging with each other which are provided on the parts of the surface of the shaft part and the inner surface of the cylindrical part.

Pistons 42A and 42B each having a cylindrical shape with a bottom are secured at their opening ends to the opposed side surfaces of the disk parts of the non-rotational engagement members 34A and 34B. The pistons 42A and 42B are aligned with the axes of the brake pads 14A and 14B, respectively. The stationary member 38 has a cylinder bore 44 having a circular sectional shape and extending along the autorotation axis 40 between the non-rotational engagement members 34A and 34B. The pistons 42A and 42B mate with the cylinder bore 44 so as to reciprocate along the autorotation axis 40 and cooperate with each other to define a cylinder chamber 48. O-ring seals 50A and 50B are inserted into ring grooves formed in the surface of the cylinder bore 44 and the O-ring seals seal the clearance between the pistons 42A and 42B and the cylinder bore 44.

It is to be noted that although only one each of the brake pads 14A and 14B, the pistons 42A and 42B, and the cylinder chamber 48 are shown in FIG. 1, they may be provided in a plurality while being equally spaced apart around the rotation axis 18.

The stationary member 38 has an annular groove 52 extending around the rotation axis 18 in the inner surface of its inner peripheral portion. The annular groove 52 is communicatingly connected with the cylinder chamber 48 by internal passages 54 extending in a radial direction. The annular groove 52 is also connected with a hydraulic brake actuator by way of a communicating hole 56 formed in the inner peripheral portion of the stationary member 38 and a conduit, not shown in the figure. A cover member 58 is secured by screws to the side surface of the stationary member 38 at positions radially outward of the inner cylindrical part. The cover member 58 covers the subsidiary rotor 22 while being spaced apart therefrom so as to prevent dust and muddy water from entering into the space between the brake rotor 12 and the stationary member 38.

As is apparent from the above descriptions, upon the hydraulic pressure in the cylinder chamber 48 is increased, the brake pads 14A and 14B, the non-rotational engagement members 34A and 34B, and the pistons 42A and 42B are moved in the directions of separating them from each other, which makes the brake pads 14A and 14B be pressed against the friction surfaces of the disk part 20A and the subsidiary rotor 22. Consequently, the pistons 42A and 42B, the cylinder bore 44 and the like function as first and second pressing devices 60A and 60B which are supported by the stationary member 38 and press the brake pads 14A and 14B against the disk part 20A and the subsidiary rotor 22 via the non-rotational engagement members 34A and 34B, respectively.

The brake pads 14A and 14B are provided with external gears 62A and 62B, respectively, on the outer peripheral portions of the disk pats thereof. The external gears 62A and 62B mesh with internal gears 64A and 64B, respectively, formed on the cylindrical part 20B of the main rotor 20. The external gears 62A, 62B and the internal gears 64A, 64B function as rotational torque transmission devices 66A and 66B, respectively, which transmit rotational torques mutually between the brake rotor 12 and the brake pads 14A and 14B without relying on the frictional forces therebetween.

Upon the wheel, not shown in the figure, is rotated, the brake rotor 12 and the rotating shaft 16 rotate around the rotation axis 18 together with the wheel, but the brake pads 14A and 14B, the sleeve part 28A, the stationary member 38, and the cover member 58 do not rotate. Consequently, the disk part 20A and the subsidiary rotor 22 rotates relative to the brake pads 14A and 14B around the rotation axis 18. The rotational torques of the disk part 20A and the subsidiary rotor 22 are transformed into rotational torques about the autorotation axis 40 and transmitted to the brake pads 14A and 14B by the rotational torque transmission devices 66A and 66B. As a result, the brake pads 14A and 14B revolve relative to the disk part 20A and the subsidiary rotor 22 around the rotation axis 18 while auto-rotating about the autorotation axis 40, and revolve relative to the non-rotational engagement members 34A and 34B around the rotation axis 18.

Accordingly, upon the brake pads 14A and 14B are pressed by the pressing devices 60A and 60B, the frictional portions on the both sides of the brake pads 14A and 14B frictionally engage with the disk part 20A and the subsidiary rotor 22 and with the non-rotational engagement members 34A and 34B, respectively, and thereby generate frictional forces. Consequently, in addition to a braking torque Trv generated by the revolution of the brake pads 14A and 14B, a braking torque Trt is generated by the autorotation of the brake pads, and the braking torque Tb of the brake device assumes the sum of these torques.

The braking torques Try and Trt are proportional to the pressing forces byf the pressing devices 60A and 60B afforded to the brake pads 14A and 14B, and the pressing forces are proportional to the hydraulic pressure in the cylinder chamber 48. Accordingly, the braking torque Tb, i.e., the braking force that the brake device 10 generates can be controlled by controlling the pressing forces through the control of the hydraulic pressure in the cylinder chamber 48.

As described above, the braking torque Tb of the brake device is the sum of the braking torques Try generated by the revolution and the braking torques Trt generated by the autorotation. As the braking torques Trt generated by the autorotation are generated on both side surfaces of the two brake pads, they are twice the braking torques Trt' generated by the brake device described in the above-mentioned Laid-Open Publication in which the braking torque generated by the autorotation is generated only on one side surface.

Therefore, a braking torque can be generated which is far higher than the braking torque generated by a conventional general brake device which generates only a braking torques Trv. A braking torque can be generated which is higher than the braking torque generated by the brake device described in the above-mentioned Laid-Open Publication.

For example, although not shown in FIG. 1, assume that the distances between the rotation axis 18 and the rotational torque transmission devices 66A and 66B are 152.5 mm; the distance between the rotation axis 18 and the autorotation axis 40 is 120 mm; and the distances between the autorotation axis 40 and the centers of the frictional portions 14AA, 14AB, 14BA, and 14BB are 25 mm. Further, assume that the friction coefficient of the frictional contact areas is μ and the pressing force by the pressing devices 60A and 60B is F kgf. A resistance torque Tst about the autorotation axis 40 generated by the autorotation of the brake pads 14A and 14B is the sum of the resistance torques generated by the autorotation of the two brake pads and is expressed by the following formula 1.

$$Tst = 2 \times 2 \times 25 \times \mu \times F \quad (1)$$
$$= 100 \ \mu F$$

The resistance torque Tst is transformed into a rotational torque about the rotation axis 18 by the rotational torque transmission devices 66A and 66B and is transmitted to the brake rotor 12 as a braking torque Trt by the autorotation. As the distances between the autorotation axis 40 and the rotational torque transmission devices 66A and 66B are 25 mm, the braking torque Trt by the autorotation is expressed by the following formula 2.

$$Trt = 100 \ \mu F / 32.5 \times 152.5 \quad (2)$$
$$= 469 \ \mu F$$

The braking torque Trv generated by the revolutions may be considered to be generated by the frictional forces which the brake pads 14A and 14B generate at their one side surface under situations where the pressing force F is exerted by the pressing devices 60A and 60B along the autorotation axis 40, and is expressed by the following formula 3.

$$Trv = 2 \times 120 \ \mu F \quad (3)$$
$$= 240 \ \mu F$$

Accordingly, the braking torque Tb which is the sum of the braking torque Trv and the braking torque Trt by the autorotation is expressed by the following formula 4. A servo ratio Rbt1 of the braking torque in relation to a conventional general brake device which can generate the braking torque Trv only is expressed by the following formula 5.

$$Tb = 469 \ \mu F + 240 \ \mu F \quad (4)$$
$$= 709 \ \mu F$$

$$Rbt1 = 709 \ \mu F / 240 \ \mu F \quad (5)$$
$$= 2.95$$

In the brake device described in the above-mentioned Laid-Open Publication, the brake pads 14A and 14B generate braking torques by the autorotations only at their one side surface. The braking torque Trt' generated by the autorotations is expressed by the following formula 6.

$$Trt' = Trt/2 \quad (6)$$
$$= 234.5 \ \mu F$$

Accordingly, a servo ratio Rbt2 of the braking torque in relation to the brake device described in the above-mentioned Laid-Open Publication is expressed by the following formula 7.

$$Rbt2 = 709 \ \mu F / (240 \ \mu F + 234.5 \ \mu F) \approx 1.49 \quad (7)$$

Thus, according to the first embodiment, in the above-described specification, it is possible to generate a braking torque which is approximately three times as that generated by a conventional general brake device and which is approximately 1.5 times as that generated by the brake device described in the above-mentioned Laid-Open Publication.

It is to be understood that in the embodiment, if the number of the brake pads and the like is N (a positive integer), the braking torque Tb assumes N times as that expressed by the formula 5. Thus, further higher braking torque can be generated and the servo ratios Rbt1 and Rbt2 can further be increased.

In particular, according to the first embodiment, the brake pads 14A and 14B frictionally engage with the disk part 20A and the like on the both side surfaces of their disk parts at the same radial positions, which enables to efficiently transmit the pressing force by the pressing devices 60A and 60B so that the pressing forces on both side surfaces become the same to each other. As compared to where the frictional engagements with the disk part 20A and the like take place at a radial position on one side surface and at another radial position on the other side surface of the disk parts of the brake pads 14A and 14B, deforming stresses acting on the brake pads can be reduced. Notably, the advantageous effects can be achieved as well in the under-described third embodiment.

Second Embodiment

Figure 2:
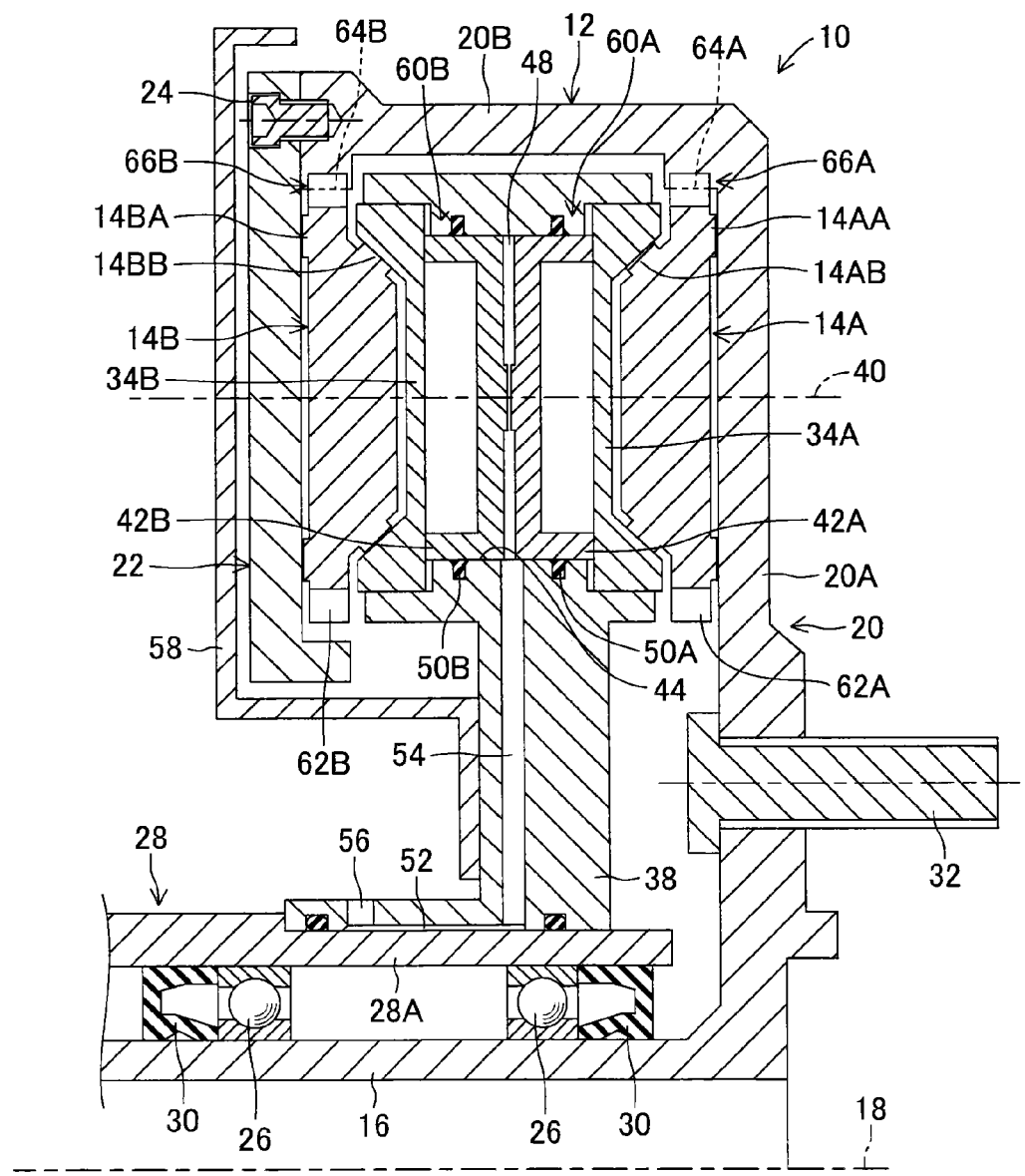
FIG. 2 is a sectional view showing a section of a second embodiment of the friction brake device according to the present invention which is structured as a modified example of the first embodiment, as cut along a section passing through a rotation axis.

FIG. 2 is a sectional view showing a section of a second embodiment of the friction brake device according to the present invention which is structured as a modified example of the first embodiment, as cut along a section passing through a rotation axis. In FIG. 2, the same members as those shown in FIG. 1 are denoted by the same reference numbers as in FIG. 1. The same goes in the under-described embodiments.

In the second embodiment, the shaft parts of the brake pads 14A and 14B are larger in diameter than those in the first embodiment, and each has a truncated conical shape which has a diameter becoming smaller as the position leaves from the disk part. The inner surfaces of the cylindrical parts of the non-rotational engagement members 34A and 34B have truncated conical shapes corresponding the shapes of the shaft parts of the brake pads 14A and 14B, respectively. The frictional portions 14AB and 14BB are not provided on the disk parts, but are provided on the shaft parts.

No ball is interposed between the shaft parts of the brake pads and the cylindrical parts of the non-rotational engagement members which corresponds to the balls 36A and 36B in the first embodiment. The end faces of the cylindrical parts of the non-rotational engagement members 34A and 34B are spaced apart from the disk parts of the brake pads 14A and 14B. It is to be noted that the truncated conical surfaces of the cylindrical parts of the non-rotational engagement members and the shaft parts of the brake pads are co-axial with the autorotation axis 40, and are inclined 45 degrees relative to the autorotation axis 40. The inclination angle may be another value.

As will be apparent from comparing FIG. 2 with FIG. 1, the second embodiment is structured in other aspects similarly to the above-described first embodiment. Thus, except that the non-rotational engagement members 34A and 34B support the shaft parts of the brake pads 14A and 14B at their truncated conical surfaces and frictionally engage with the frictional portions 14AB and 14BB, the second embodiment operates similarly to the first embodiment. Consequently, advantageous effects similar to those in the first embodiment can be achieved.

In this embodiment, however, when the non-rotational engagement members 34A and 34B are pressed with the pressing force F by the pressing devices 60A and 60B, respectively, the forces with which the non-rotational engagement members 34A and 34B press the brake pads 14A and 14B, respectively, at their truncated conical surfaces become $F/2^{1/2}$. However, the non-rotational engagement members 34A and 34B press the brake pads 14A and 14B against the disk part 20A and the subsidiary rotor 22, respectively, with a pressing force of F along the autorotation axis 40. Assume that the distances between the autorotation axis 40 and the brake pads 14A and 14B are 23 mm and the other specifications of the brake device 10 are the same as those of the first embodiment. Then, the resistance torque Tst acting about the autorotation axis 40 which is generated by the autorotation of the brake pads 14A and 14B is expressed by the following formula 8.

$$Tst = 2 \times 25 \times \mu \times F + 2 \times 23 \times \mu \times F \times 2^{1/2} \quad (8)$$
$$= 96 \, \mu F$$

As the braking torque Trt generated by the autorotation of the brake pads is expressed by the following formula 9, the braking torque Tb which is the sum of the braking torque Trv and the braking torque Trt by the autorotation is expressed by the following formula 10.

$$Trt = 96 \, \mu F / 32.5 \times 152.5 \approx 450 \, \mu F \quad (9)$$

-continued
$$Tb = 450 \, \mu F + 240 \, \mu F \quad (10)$$
$$= 690 \, \mu F$$

A servo ratios Rbt1 and Rbt2 of the braking torque in relation to a conventional general brake device and the brake device described in the above-mentioned Laid-Open Publication, respectively, are expressed by the following formulae 11 and 12.

$$Rbt1 = 690 \, \mu F / 240 \, \mu F \quad (11)$$
$$= 2.88$$
$$Rbt2 = 690 \, \mu F / (240 \, \mu F + 234.5 \, \mu F) \approx 1.45 \quad (12)$$

Thus, according to the second embodiment, the brake device can generate a braking torque which is much higher than that generated by a conventional general brake device and which is higher than that generated by the brake device described in the above-mentioned Laid-Open Publication.

It is to be understood that if the number of the brake pads and the like is N (a positive integer), the braking torque Tb assumes N times as that expressed by the formula 10. Thus, in the second embodiment, further higher braking torque can be generated and the servo ratios Rbt1 and Rbt2 can further be increased.

According to the second embodiment, a plurality of balls need not to be interposed between the shaft parts of the brake pads 14A, 14B and the cylindrical parts of the non-rotational engagement members 34A, 34B. Consequently, as compared to the first embodiment, the structure of the brake device can be simplified, and assembly and disassembly for maintenance can more easily be performed.

According to the first and second embodiments, the disk part 20A, the cylindrical part 20B and the subsidiary rotor 22 form a staple-like sectional shape which opens radially inwardly in a radial section passing through the rotation axis 18. The pressing devices 60A and 60B are provided between the disk part 20A and the subsidiary rotor 22 together with the brake pads 14A and 14B, and are adapted to press the brake pads 14A and 14B against the disk part and the subsidiary rotor in the directions of separating them from each other.

Consequently, a caliper is not required which supports the pair of friction members and the pressing devices and bears the reaction forces of the pressing forces generated by the pressing devices on the opposite sides of the brake rotor as in a conventional disk type brake device and the undermentioned third and fourth embodiments. No enhancement of the caliper in rigidity is required. Since the disk part 20A and the subsidiary rotor 22 which serve as the first and second disk parts extend around the rotation axis 18 over the entire circumference, the brake rotor 12 can be enhanced in rigidity as compared to a caliper which extend only in an arc shape around the rotation axis.

The pressing forces generated by the pressing devices 60A and 60B are controlled by means of controlling the hydraulic pressure in the cylinder chamber 48 and the latter is formed in the stationary member 38 positioned between the disk part 20A and the subsidiary rotor 22. The hydraulic pressure is controlled by way of the internal passage 54 formed in the stationary member 38.

Accordingly, conduits and the like can be made unnecessary which are connected with the pressing devices for actuating the same in a brake device where pressing devices are positioned outside the brake rotor as in a conventional disk type brake device and the under-mentioned third and fourth embodiments.

Therefore, according to the first and second embodiments, as compared to a conventional disk type brake device, while restraining increase in size, complication in structure and cost up, the brake rotor 12 can be enhanced in rigidity, which enables to enhance the rigidity and durability of the brake device 10.

In particular, according to the first embodiment, the pistons 42A and 42B mate with the cylinder bore 44 to define the common cylinder chamber 48 therebetween and reciprocate along the axis 40 parallel with the rotation axis 18. Accordingly, as compared to, for example, the under-mentioned third and fourth embodiments in which the pistons 42A and 42B mates with the associated cylinder bores, it is possible to reduce the number of the cylinder bores and the number of the internal passages 54 and the like for controlling the pressure in the cylinder chamber. The stationary member 38 does not need to bear the reaction forces of the pressing forces exerted by the pressure in the cylinder chamber 48 against the disk part 20A and the subsidiary rotor 22. Accordingly, the structure of the brake device 10 can be simplified as compared to where the pistons 42A and 42B mates with the associated cylinder bores.

According to the first and second embodiments, the thickness of the cylindrical part 20B is smaller than those of the disk part 20A and the subsidiary rotor 22. However, the cylindrical part 20B extends cylindrically around the rotation axis 18 and it has a rigidity higher than those of the disk part 20A and the subsidiary rotor 22.

Consequently, as compared to where the cylindrical part 20B has a rigidity lower than those of the disk part 20A and the subsidiary rotor 22, it is possible to reduce the deformation amount by which the disk part 20A and the subsidiary rotor 22 deform in the direction of separating them from each other during the operation of the brake device 10. Therefore, as compared to where the magnitude relation of the rigidities is reversed, the braking action of the brake device 10 can be enhanced.

In addition, according to the first and second embodiments, the main rotor 20 and the subsidiary rotor 22 form a staple-like sectional shape which opens radially inwardly as viewed in a radial section passing through the rotation axis 18. The stationary member 38 which supports the pressing devices consisting of the brake pads 14A, 14B, the pistons 42A, 42B and the like is supported at its inner peripheral by the wheel carrier member 28 and extends into the space between the disk part 20A and the subsidiary rotor 22 from the radially inward position.

Consequently, as compared to where the main rotor 20 and the subsidiary rotor 22 form a staple-like sectional shape which opens in a direction other than the radially inward direction, the structure of the stationary member 38 can be simplified, which enables to simplify in structure and downsize the brake device 10.

Further, according to the first and second embodiments, the cylindrical part 20B is integral with the disk part 20A, and the cylindrical part 20B and the disk part 20A form the main rotor 20 to which a rim part of a vehicle wheel is coupled.

Consequently, as compared to where the cylindrical part 20B is a part of the subsidiary rotor 22 and the cylindrical part 20B is coupled to a main rotor having a substantially disk shape, it is possible to enhance the rigidity of the brake rotor 12 and to enhance the attachment strength of the brake device 10 coupled to a rim part of a vehicle wheel.

Third Embodiment

Figure 3:
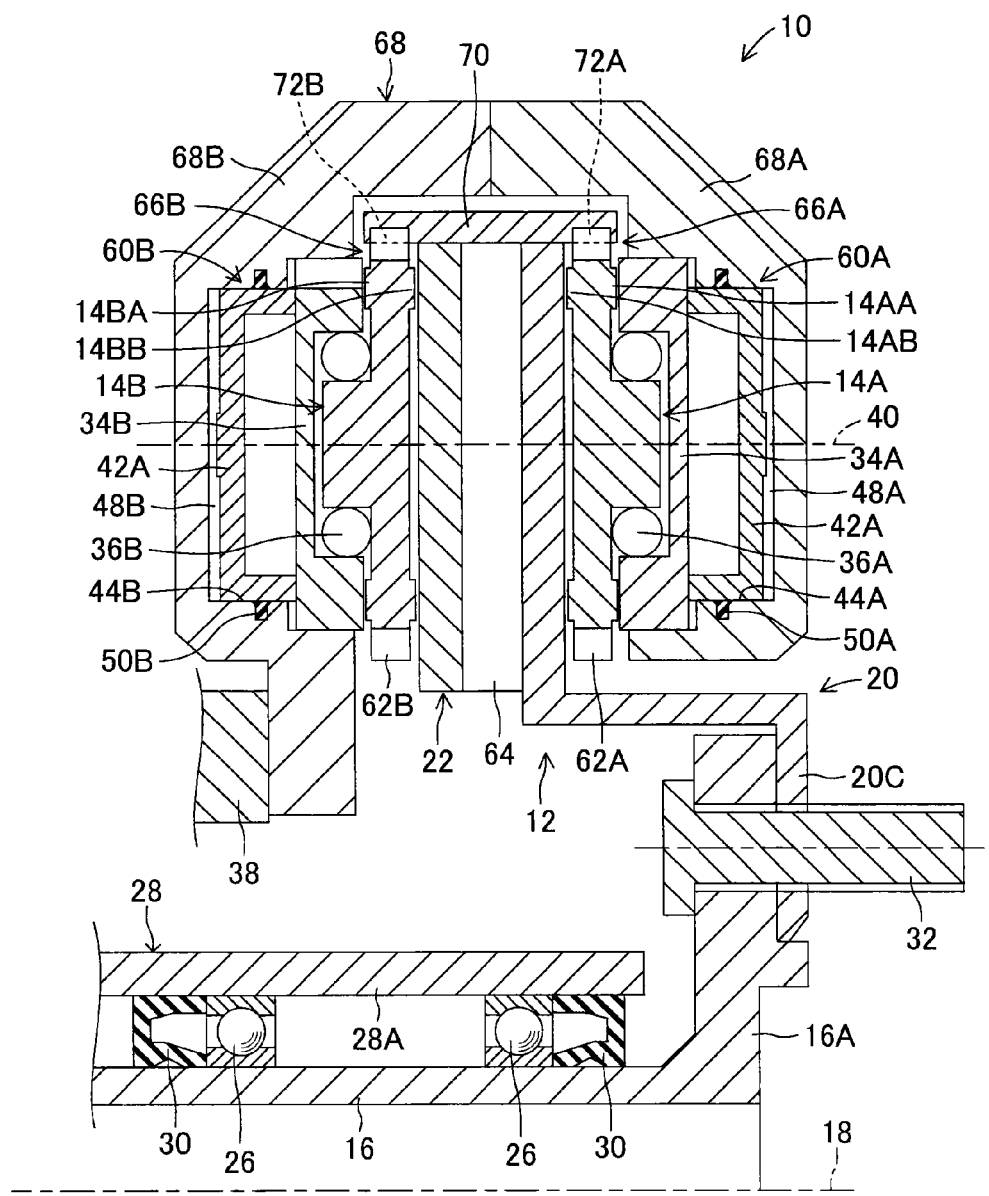
FIG. 3 is a sectional view showing a section of a third embodiment of the friction brake device according to the present invention which is adapted to be a brake device for a vehicle, as cut along a section passing through a rotation axis.

FIG. 3 is a sectional view showing a section of a third embodiment of the friction brake device according to the present invention which is adapted to be a brake device for a vehicle, as cut along a section passing through a rotation axis.

In the third embodiment, the main rotor 20 does not have the cylindrical part 20B and is a member separate from the rotating shaft 16. The annular strip-like disk part 20A of the main rotor 20 is integrally connected to the subsidiary rotor 22 by a connection part 64 which consists of fins for discharging heat. The rotating shaft 16 has a flange part 16A at the outer peripheral portion thereof and the flange part 16A is coupled with a inner peripheral portion of a rim part 20C which is integral with the disk part 20A by four bolts 32. Accordingly, although not shown in the figure, the bolts 32 and the nuts threaded with the bolts integrally couple the rim part 20C to a rim part of a vehicle wheel together with the flange part 16A by co-fastening.

The brake pads 14A, 14B, the non-rotational engagement members 34A, 34B and the pistons 42A, 42B are positioned on both sides of the brake rotor 12 as opposed in reverse directions as those in the first embodiment. Accordingly, the disk parts of the brake pads 14A and 14B are positioned on the sides of the disk part 20A and the subsidiary rotor 22, respectively, and the shaft parts extend in the direction of separating them from each other from the associated disk parts. The non-rotational engagement members 34A and 34B are supported by a caliper 68 extending substantially in U-shape in section bridging over the outer peripheral portion of the brake rotor 20 so that the non-rotational engagement members can displace along the autorotation axis 40 relative to the brake rotor 20 but cannot rotate about the autorotation axis 40.

The caliper 68 consists of half bodies 68A and 68B integrally coupled by a coupling means such as bolts, and the half body 68B is integrally secured to the stationary member 38 by a coupling means such as bolts. The half bodies 68A and 68B are provided with cylinder bores 44A and 44B, respectively, extending along the autorotation axis 40. The pistons 42A and 42B mate with the cylinder bores 44A and 44B, respectively, so as to reciprocate along the autorotation axis 40, and cooperate with the half bodies 68A and 68B to define cylinder chambers 48A and 48B, respectively. Thus, the pressing devices 60A and 60B in the third embodiment are formed by the pistons 42A, 42B and the cylinder chambers 48A, 48B, respectively.

Although not shown in FIG. 3, the cylinder chambers 48A and 48B are connected with a hydraulic brake actuator by internal passages provided in the half bodies 68A and 68B and conduits communicating therewith. Thus, the hydraulic pressures in the cylinder chambers 48A and 48B are controlled in unison to the same pressure by the brake actuator.

A ring gear member 70 is secured to the outer peripheral portion of the main rotor 20 by means of welding or the like and the ring gear member 70 has internal gears 72A and 72B on the inner cylindrical surface of the opposite ends thereof. The internal gears 72A and 72B mesh with the external gears 62A and 62B provided on the outer peripheral portions of the disk parts of the brake pads 14A and 14B, respectively. The external gears 62A, 62B and the internal gears 72A, 72B function as rotational torque transmission devices 66A and 66B between the brake rotor 12 and the brake pads 14A and 14B, respectively.

As will be apparent from comparing FIG. 3 with FIG. 1, the third embodiment is structured in other aspects similarly to the above-described first embodiment. Thus, except that the brake pads 14A and 14B are pressed by the pressing devices 60A and 60B in the directions of moving them near to each other so as to be depressed against the disk part 20A and the subsidiary rotor 22, the third embodiment operates similarly to the first embodiment.

Thus, according to the third embodiment, as in the first and second embodiments, the brake device can generate a braking torque which is much higher than that generated by a conventional general brake device and which is higher than that generated by the brake device described in the above-mentioned Laid-Open Publication.

Assume that the distances in the brake devices 10 are the same as those in the first embodiment, the servo ratios Rbt1 and Rbt2 of the braking torque are the same as those in the first embodiment. According to the third embodiment, in the above-described specification, it is possible to generate a braking torque which is approximately three times as that generated by a conventional general brake device and which is approximately 1.5 times as that generated by the brake device described in the above-mentioned Laid-Open Publication.

Fourth Embodiment

Figure 4:
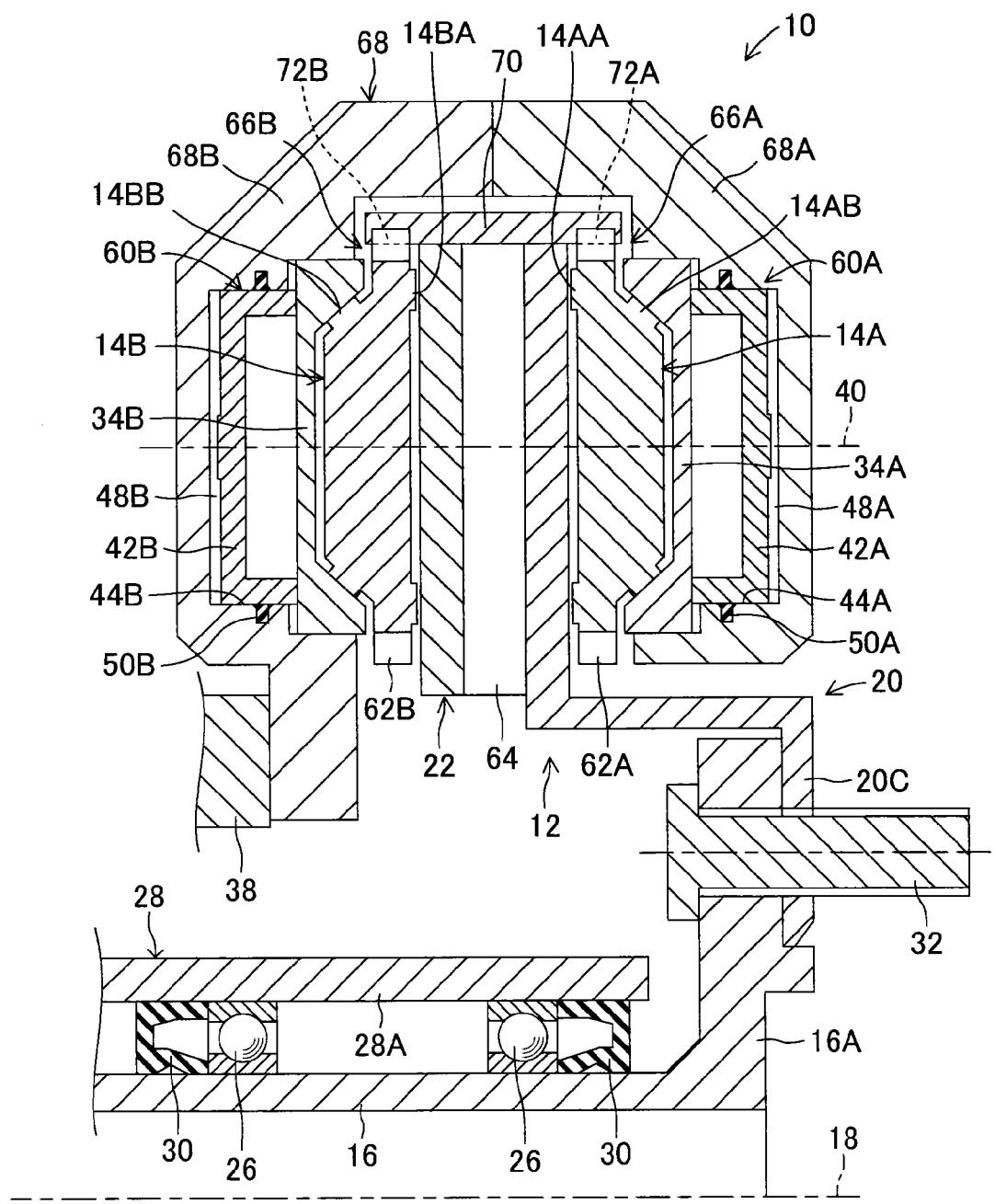
FIG. 4 is a sectional view showing a section of a fourth embodiment of the friction brake device according to the present invention which is structured as a modified example of the third embodiment, as cut along a section passing through a rotation axis.

FIG. 4 is a sectional view showing a section of a fourth embodiment of the friction brake device according to the present invention which is structured as a modified example of the third embodiment, as cut along a section passing through a rotation axis.

In the fourth embodiment, the same modification as is applied to the first embodiment in the second embodiment is applied to the third embodiment. That is, shaft parts of the brake pads 14A and 14B are larger in diameter than those in the third embodiment, and each has a truncated conical shape which has a diameter becoming smaller as the position leaves from the disk part. The inner surfaces of the cylindrical parts of the non-rotational engagement members 34A and 34B have truncated conical shapes corresponding the shapes of the shaft parts of the brake pads 14A and 14B, respectively. The frictional portions 14AB and 14BB are not provided on the disk parts, but are provided on the shaft parts.

No ball is interposed between the shaft parts of the brake pads and the cylindrical parts of the non-rotational engagement members which corresponds to the balls 36A and 36B in the third embodiment. The end faces of the cylindrical parts of the non-rotational engagement members 34A and 34B are spaced apart from the disk parts of the brake pads 14A and 14B. It is to be noted that the truncated conical surfaces of the cylindrical parts of the non-rotational engagement members and the shaft parts of the brake pads are co-axial with the autorotation axis 40, and are inclined 45 degrees relative to the autorotation axis 40. The inclination angle may be another value.

As will be apparent from comparing FIG. 4 with FIG. 3, the fourth embodiment is structured in other aspects similarly to the above-described third embodiment. Thus, except that the non-rotational engagement members 34A and 34B support the shaft parts of the brake pads 14A and 14B at their truncated conical surfaces and frictionally engage with the frictional portions 14AB and 14BB, the fourth embodiment operates similarly to the third embodiment.

Thus, according to the fourth embodiment, as in the first to third embodiments, the brake device can generate a braking torque which is much higher than that generated by a conventional general brake device and which is higher than that generated by the brake device described in the above-mentioned Laid-Open Publication.

Assume that the distances in the brake devices 10 are the same as those in the second embodiment, and then the servo ratios Rbt1 and Rbt2 of the braking torque are the same as those in the second embodiment. According to the fourth embodiment, in the above-described specification, it is possible to generate a braking torque which is approximately 3.3 times as that generated by a conventional general brake device and which is approximately 1.6 times as that generated by the brake device described in the above-mentioned Laid-Open Publication.

According to the fourth embodiment, a plurality of balls need not to be interposed between the shaft parts of the brake pads 14A, 14B and the cylindrical parts of the non-rotational engagement members 34A, 34B. Consequently, as compared to the third embodiment, the structure of the brake device can be simplified, and assembly and disassembly for maintenance can more easily be performed.

While the present invention has been described with reference to the above embodiments, it will be apparent to those skilled in the art that the present invention is not limited thereto, but may be embodied in various other forms without departing from the scope of the invention.

For example, while in the above-described embodiments, the brake pads, the non-rotational engagement members, the pistons and the pressing devices are provided in pairs, they may be provided one each.

In the above-described embodiments, the rotational torque transmission devices 66A and 66B are defined by the internal gears formed on the brake rotor 12 and the external gears formed on the brake pads 14A and 14B. However, the gears formed on the brake rotor 12 may be external gears formed on the radially inner side of the brake pads 14A and 14B. The rotational torque transmission device may be configured in any structure so long as it can transmit the rotational torque between the brake rotor 12 and the brake pads 14A and 14B to each other.

In the above-described embodiments, while the brake pads 14A, 14B, the non-rotational engagement members 34A, 34B and the pistons 42A, 42B have the same diameters to each other, they may have different diameters from each other.

In the above-described first and third embodiments, the frictional portions 14AA to 14BB formed on both sides of the brake pads 14A and 14B are provided at the same radial positions to each other from the autorotation axis 40 as a center. However, the frictional portions formed on both sides of the brake pads 14A and 14B may be provided at different radial positions from each other.

In the above-described embodiments, the brake pads 14A and 14B are provided with the shaft parts and the non-rotational engagement members 34A and 34B rotatably support the shaft parts. However, the non-rotational engagement members 34A and 34B may be provided with shaft parts and the brake pads 14A and 14B may rotatably be supported by the shaft parts.

In the above-described first and second embodiments, the main rotor 20 and the subsidiary rotor 22 do not cooperate with the rotating shaft 16, the wheel carrier member 28 and the stationary member 38 to define a closed space, they may define a closed space. In that case, the closed space may be filled with a lubricant.

In the above-described first and second embodiments, the cylindrical part 20B is integrally formed to the disk part 20A so as to form the main rotor 20. However, the cylindrical part 20B may integrally be formed to the subsidiary rotor 22 and, alternatively, the disk part 20A, the disk part 20A and the subsidiary rotor 22 may be separate members.

While in the above-described embodiments, the pressing devices are hydraulic devices in which pistons mate with the cylinder bores to define cylinder chambers, they may be electromagnetic actuators. In addition, while in the above-described embodiments, the brake device is one for a vehicle, the brake device according to the present invention may be applied to any application other than a vehicle.

The invention claimed is:

1. A friction brake device comprising:
   a brake rotor which rotates around a rotation axis;
   a rotating friction member which rotates around an autorotation axis parallel to the rotation axis;
   a rotational torque transmission device which mutually transmits rotational torque between said brake rotor and said rotating friction member without depending on a friction force between said brake rotor and said rotating friction member; and
   a pressing device which presses said rotating friction member against said brake rotor, wherein
   said pressing device presses said rotating friction member against said brake rotor by way of a non-rotating friction member which is supported so as not to rotate around said autorotation axis, and
   said rotational torque transmission device includes gears which are formed on said brake rotor and said rotating friction member and mesh with each other.

2. The friction brake device according to claim 1, wherein said rotating friction member has a disk part which is aligned with said autorotation axis, and
   when said non-rotating friction member is pressed against said rotating friction member by said pressing device, said rotating friction member frictionally engages with said brake rotor at one surface of said disk part and frictionally engages with said non-rotating friction member at the other surface of said disk part.

3. The friction brake device according to claim 1, wherein said rotating friction member has a disk part which is aligned with said autorotation axis;
   one of said rotating friction member and said non-rotating friction member has a shaft part having a truncated conical surface;
   the other of said rotating friction member and said non-rotating friction member has a truncated conical surface which receives said truncated conical surface of said shaft part; and
   when said non-rotating friction member is pressed against said rotating friction member by said pressing device, said rotating friction member frictionally engages with said brake rotor at one surface of said disk part, and said rotating friction member and said non-rotating friction member frictionally engage with each other at said truncated conical surfaces.

4. A friction brake device comprising:
   a brake rotor which rotates around a rotation axis;
   a rotating friction member which rotates around an autorotation axis parallel to the rotation axis;
   a rotational torque transmission device which mutually transmits rotational torque between said brake rotor and said rotating friction member without depending on a friction force between said brake rotor and said rotating friction member; and
   a pressing device which presses said rotating friction member against said brake rotor, wherein
   said pressing device presses said rotating friction member against said brake rotor by way of a non-rotating friction member which is supported so as not to rotate around said autorotation axis;
   said rotating friction member has a disk part which is aligned with said autorotation axis;
   one of said rotating friction member and said non-rotating friction member has a shaft part having a truncated conical surface;
   the other of said rotating friction member and said non-rotating friction member has a truncated conical surface which receives said truncated conical surface of said shaft part; and
   when said non-rotating friction member is pressed against said rotating friction member by said pressing device, said rotating friction member frictionally engages with said brake rotor at one surface of said disk part, and said rotating friction member and said non-rotating friction member frictionally engage with each other at said truncated conical surfaces.

5. The friction brake device according to claim 4, wherein said rotational torque transmission device includes gears which are formed on said brake rotor and said rotating friction member and mesh with each other.

* * * * *